(12) United States Patent
Little et al.

(10) Patent No.: US 9,311,237 B2
(45) Date of Patent: *Apr. 12, 2016

(54) SYSTEM AND METHOD OF SECURE GARBAGE COLLECTION ON A MOBILE DEVICE

(71) Applicant: Citrix Systems International GmbH, Schaffhausen (CZ)

(72) Inventors: Herbert Anthony Little, Waterloo (CA); Neil Patrick Adams, Waterloo (CA); Stefan E. Janhunen, Waterloo (CA); John Fredric Arthur Dahms, Waterloo (CA)

(73) Assignee: Citrix Systems International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,845

(22) Filed: Mar. 2, 2015

(65) Prior Publication Data

US 2015/0234743 A1 Aug. 20, 2015

Related U.S. Application Data

(63) Continuation of application No. 13/556,959, filed on Jul. 24, 2012, now Pat. No. 8,973,148, which is a continuation of application No. 12/702,635, filed on Feb. 9, 2010, now Pat. No. 8,261,358, which is a (Continued)

(51) Int. Cl.
*G06F 7/04* (2006.01)
*G06F 12/02* (2006.01)
*G06F 17/30* (2006.01)

(52) U.S. Cl.
CPC ...... *G06F 12/0253* (2013.01); *G06F 17/30864* (2013.01); *G06F 2212/702* (2013.01)

(58) Field of Classification Search
CPC .................. G06F 12/0253; G06F 17/30864
See application file for complete search history.

(56) References Cited

U.S. PATENT DOCUMENTS

| | | |
|---|---|---|
| 4,775,932 A | 10/1988 | Oxley et al. |
| 4,853,842 A | 8/1989 | Thatte et al. |
| 4,989,137 A | 1/1991 | Oxley et al. |

(Continued)

FOREIGN PATENT DOCUMENTS

| | | |
|---|---|---|
| CA | 2479526 A1 | 9/2003 |
| EP | 1411709 A2 | 4/2004 |

(Continued)

OTHER PUBLICATIONS

Yeates, Stuart A., et al.; "Design Patterns in Garbage Collection"; Technology of Object-Oreinted Languages and Systems; Nov. 24, 1997; 19 pages.

(Continued)

*Primary Examiner* — Techane Gergiso
(74) *Attorney, Agent, or Firm* — Banner & Witcoff, Ltd.

(57) ABSTRACT

A method and system for performing garbage collection involving sensitive information on a mobile device. Secure information is received at a mobile device over a wireless network. The sensitive information is extracted from the secure information. A software program operating on the mobile device uses an object to access the sensitive information. Secure garbage collection is performed upon the object after the object becomes unreachable.

15 Claims, 7 Drawing Sheets

Related U.S. Application Data continuation of application No. 10/508,187, filed as application No. PCT/CA03/00402 on Mar. 20, 2003, now Pat. No. 7,661,140.

(60) Provisional application No. 60/365,515, filed on Mar. 20, 2002.

(56) References Cited

U.S. PATENT DOCUMENTS

| | | | |
|---|---|---|---|
| 5,088,036 | A | 2/1992 | Ellis et al. |
| 5,392,432 | A * | 2/1995 | Engelstad ............ G06F 12/0253 |
| 5,485,613 | A | 1/1996 | Engelstad et al. |
| 5,560,003 | A | 9/1996 | Nilsen et al. |
| 5,819,304 | A | 10/1998 | Nilsen et al. |
| 5,845,298 | A | 12/1998 | O'Connor et al. |
| 5,960,087 | A | 9/1999 | Tribble et al. |
| 6,012,065 | A | 1/2000 | Boucher et al. |
| 6,049,810 | A | 4/2000 | Schwartz et al. |
| 6,065,020 | A | 5/2000 | Dussud |
| 6,081,665 | A | 6/2000 | Nilsen et al. |
| 6,138,005 | A | 10/2000 | Park |
| 6,209,003 | B1 | 3/2001 | Mattis et al. |
| 6,349,314 | B1 | 2/2002 | Patel |
| 6,453,403 | B1 | 9/2002 | Czajkowski |
| 6,546,546 | B1 | 4/2003 | Van Doorn |
| 6,654,773 | B2 | 11/2003 | Hills |
| 6,662,020 | B1 | 12/2003 | Aaro et al. |
| 6,662,023 | B1 | 12/2003 | Helle |
| 6,701,334 | B1 | 3/2004 | Ye et al. |
| 6,704,489 | B1 | 3/2004 | Kurauchi et al. |
| 6,704,756 | B2 | 3/2004 | Wollrath et al. |
| 6,804,765 | B2 | 10/2004 | Kolodner et al. |
| 6,807,169 | B2 | 10/2004 | Mattathil |
| 6,865,657 | B1 | 3/2005 | Traversat et al. |
| 6,993,588 | B2 | 1/2006 | Davis et al. |
| 7,013,454 | B2 | 3/2006 | Bush et al. |
| 7,104,445 | B2 | 9/2006 | Little et al. |
| 7,231,199 | B2 | 6/2007 | Adams et al. |
| 7,243,356 | B1 | 7/2007 | Saulpaugh et al. |
| 7,263,700 | B1 | 8/2007 | Bacon et al. |
| 7,412,518 | B1 | 8/2008 | Duigou et al. |
| 7,496,957 | B2 | 2/2009 | Howard et al. |
| 7,543,160 | B2 | 6/2009 | Adams et al. |
| 7,617,264 | B1 | 11/2009 | Garthwaite |
| 7,620,943 | B1 | 11/2009 | Garthwaite |
| 7,661,140 | B2 | 2/2010 | Little et al. |
| 8,042,189 | B2 | 10/2011 | Little et al. |
| 8,261,358 | B2 | 9/2012 | Little et al. |
| 8,522,355 | B2 | 8/2013 | Little et al. |
| 8,973,148 | B2 | 3/2015 | Little et al. |
| 2002/0055929 | A1 | 5/2002 | Kolodner et al. |
| 2002/0095453 | A1* | 7/2002 | Steensgaard ........ G06F 12/0269 718/107 |
| 2002/0107879 | A1 | 8/2002 | Arnold et al. |
| 2002/0133533 | A1 | 9/2002 | Czajkowski et al. |
| 2002/0138634 | A1 | 9/2002 | Davis et al. |
| 2002/0147969 | A1* | 10/2002 | Lethin ................. G06F 9/45504 717/138 |
| 2002/0194245 | A1 | 12/2002 | Simpson et al. |
| 2002/0194471 | A1 | 12/2002 | Benantar et al. |
| 2003/0126462 | A1 | 7/2003 | Howard et al. |
| 2005/0020315 | A1 | 1/2005 | Robertson |
| 2005/0257043 | A1 | 11/2005 | Adams et al. |
| 2006/0036849 | A1 | 2/2006 | Brown et al. |
| 2006/0053306 | A1 | 3/2006 | Adams et al. |

FOREIGN PATENT DOCUMENTS

| | | |
|---|---|---|
| EP | 1501330 A2 | 1/2005 |
| EP | 1633155 A1 | 3/2006 |
| WO | 200104744 A2 | 1/2001 |
| WO | 200190883 A2 | 11/2001 |
| WO | 2003079196 A2 | 9/2003 |
| WO | 2005106676 A1 | 11/2005 |
| WO | 2008074123 A1 | 6/2008 |

OTHER PUBLICATIONS

Mathiske, Bernd, et al.; "Automatic Persistent Memory Management for the SpotlessTM Virtual Machine on the Palm Connected Organizer"; Jun. 2000; 24 pages.

Research in Motion Limited; "BlackberryTM Security for Lotus DominoTM"; Version 2.0 with Service Pack 2; 2001; 14 pages.

Sun Microsystems; "J2ME Building Blocks for Mobile Devices"; May 19, 2000; 44 pages.

Friesen, Jeff, et al.; "Trash Talk, Part 1—Java Recycles It's Memory Through Garbage Collection"; Dec. 7, 2001; 10 pages.

Yeates, Stuart A., et al.; "Design of a Garbage Collector Using Design Patterns"; Sep. 25-28, 1997; 16 pages.

Office Action dated Aug. 19, 2008; U.S. Appl. No. 10/508,187, filed Sep. 17, 2004; 18 pages.

Office Action dated Mar. 18, 2009; U.S. Appl. No. 10/508,187, filed Sep. 17, 2004; 16 pages.

Notice of Allowance dated Sep. 21, 2009; U.S. Appl. No. 10/508,187, filed Sep. 17, 2004; 10 pages.

Office Action dated Jun. 24, 2011; U.S. Appl. No. 12/702,635, filed Feb. 9, 2010; 14 pages.

Final Office Action dated Nov. 1, 2011; U.S. Appl. No. 12/702,635, filed Feb. 9, 2010; 9 pages.

Advisory Action dated Jan. 9, 2012; U.S. Appl. No. 12/702,635, filed Feb. 9, 2010; 3 pages.

Notice of Allowance dated May 25, 2012; U.S. Appl. No. 12/702,635, filed Feb. 9, 2010; 16 pages.

Office Action dated Nov. 29, 2013; U.S. Appl. No. 13/556,959, filed Jul. 24, 2012; 31 pages.

Final Office Action dated Mar. 27, 2014; U.S. Appl. No. 13/556,959, filed Jul. 24, 2012; 20 pages.

Advisory Action dated Jun. 2, 2014; U.S. Appl. No. 13/556,959, filed Jul. 24, 2012; 7 pages.

Notice of Allowance dated Oct. 27, 2014; U.S. Appl. No. 13/556,959, filed Jul. 24, 2012; 13 pages.

Office Action dated Dec. 30, 2009; U.S. Appl. No. 11/614,561, filed Dec. 21, 2006; 28 pages.

Final Office Action dated Jun. 8, 2010; U.S. Appl. No. 11/614,561, filed Dec. 21, 2006; 36 pages.

Office Action dated Nov. 5, 2010; U.S. Appl. No. 11/614,561, filed Dec. 21, 2006; 42 pages.

Notice of Allowance dated May 10, 2011; U.S. Appl. No. 11/614,561, filed Dec. 21, 2006; 9 pages.

Notice of Allowance dated Jun. 20, 2011; U.S. Appl. No. 11/614,561, filed Dec. 21, 2006; 11 pages.

Notice of Allowance dated Apr. 29, 2013; U.S. Appl. No. 13/274,964, filed Oct. 17, 2011; 32 pages.

PCT International Search Report; Application No. PCT/CA2003/00402; Jan. 26, 2004; 5 pages.

PCT International Preliminary Examination Report; Application No. PCT/CA2003/00402; Aug. 20, 2004; 14 pages.

Canadian Office Action; Application No. 2,479,526; Nov. 16, 2009; 3 pages.

Canadian Office Action; Application No. 2,479,526; Mar. 17, 2008; 3 pages.

Canadian Office Action; Application No. 2,479,526; Mar. 7, 2011; 3 pages.

Canadian Office Action; Application No. 2,479,526; Jan. 17, 2013; 3 pages.

Canadian Office Action; Application No. 2,479,526; Feb. 25, 2014; 2 pages.

Chinese Office Action; Application No. 03811230.2; Mar. 10, 2006; 10 pages.

European Examination Report; Application No. 03711735.5; Sep. 14, 2005; 7 pages.

European Examination Report; Application No. 03711735.5; Aug. 22, 2006; 3 pages.

European Examination Report; Application No. 03711735.5; Aug. 19, 2014; 9 pages.

(56) References Cited

OTHER PUBLICATIONS

Indian Office Action; Application No. 2791/DELNP/2004; Feb. 7, 2006; 2 pages.
Indian Office Action; Application No. 2791/DELNP/2004; Nov. 15, 2006; 1 page.
Japanese Office Action; Application No. 2009-161991; Sep. 15, 2011; 7 pages.
PCT International Search Report; Application No. PCT/CA2006/002093; Aug. 21, 2007; 3 pages.
PCT Written Opinion of the International Searching Authority; Application No. PCT/CA2006/002093; Aug. 21, 2007; 5 pages.
Canadian Office Action; Application No. 2,671,824; May 16, 2012; 2 pages.
Canadian Notice of Allowance; Application No. 2,671,824; Jan. 28, 2013; 1 page.
European Extended Search Report; Application No. 06840520; May 21, 2010; 8 pages.
European Examination Report; Application No. 06840520; Nov. 15, 2011; 5 pages.

\* cited by examiner

PHYSICAL VIEW

LOGICAL VIEW

SYSTEM AND METHOD OF SECURE GARBAGE COLLECTION ON A MOBILE DEVICE

CROSS-REFERENCE TO RELATED APPLICATIONS

This application is a continuation of U.S. patent application Ser. No. 13/556,959 filed on Jul. 24, 2012 entitled "System and Method of Secure Garbage Collection on a Mobile Device", which is a continuation of U.S. Pat. No. 8,261,358 issued on Sep. 4, 2012 entitled "System and Method of Secure Garbage Collection on a Mobile Device", which is a continuation of U.S. Pat. No. 7,661,140 issued on Feb. 9, 2010 entitled "System and Method of Secure Garbage Collection on a Mobile Device", which is a filing under 35 U.S.C. 371 of International Application No. PCT/CA2003/00402 filed on Mar. 20, 2003 entitled "System and Method of Secure Garbage Collection on a Mobile Device", claiming priority to U.S. Provisional Application No. 60/365,515 filed on Mar. 20, 2002, all of which are incorporated by reference herein as if reproduced in their entirety.

BACKGROUND

This invention relates generally to mobile devices and more particularly to secure memory techniques on a mobile device.

DESCRIPTION OF THE RELATED ART

Many known mobile devices support objects, such as by using Java to send, receive, or at least use data, voice, and/or multi-media (audio/video). These objects may be involved in sensitive information from cellular networks and with many different services. However, garbage collection operations presently performed on mobile devices have security deficiencies.

A non-limiting example of the deficiencies includes collection of unreachable objects. For example, FIG. 1 shows a typical state of a heap between garbage collections of unreferenced objects. A typical garbage collector waits until memory becomes low before collecting unreachable objects. Thus, an object may become unreachable well before it is collected. This creates an unpredictable window of opportunity for an attack, especially if the memory recovery itself is not secure.

SUMMARY

In accordance with the teachings disclosed herein, a secure garbage collection system is provided which includes a microprocessor, and an addressable storage, having a heap and a secure garbage collection software module capable of calling a wipe function. When the secure garbage collection software module has detected that objects in the heap are unreachable, it securely reclaims the memory they were using by calling the wipe function.

In another embodiment, the secure garbage collection may be triggered in many different ways, including but not limited to the steps of: waiting for a trigger, performing subsequent steps for all secure applications, requesting that a secure application unreference sensitive objects, perform secure garbage collecting, and determine if all secure applications have been processed.

DETAILED DESCRIPTION

Figure 1:
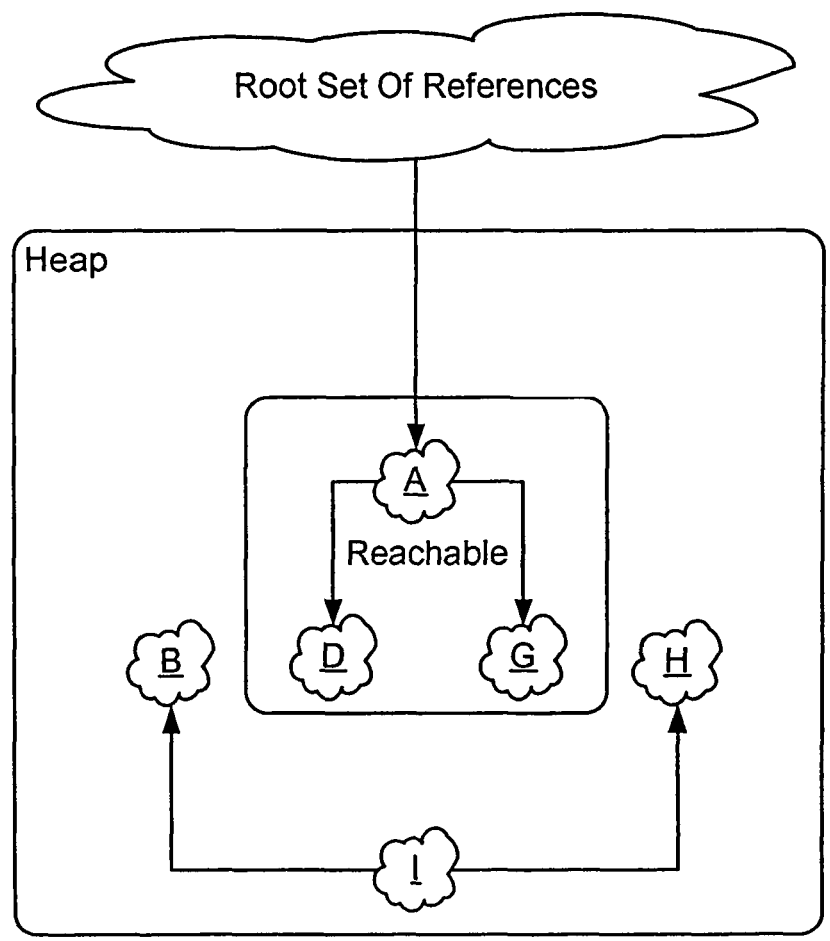
FIG. 1 shows the state of a typical heap between unreferenced objects using a known garbage collector.
Figure 2:
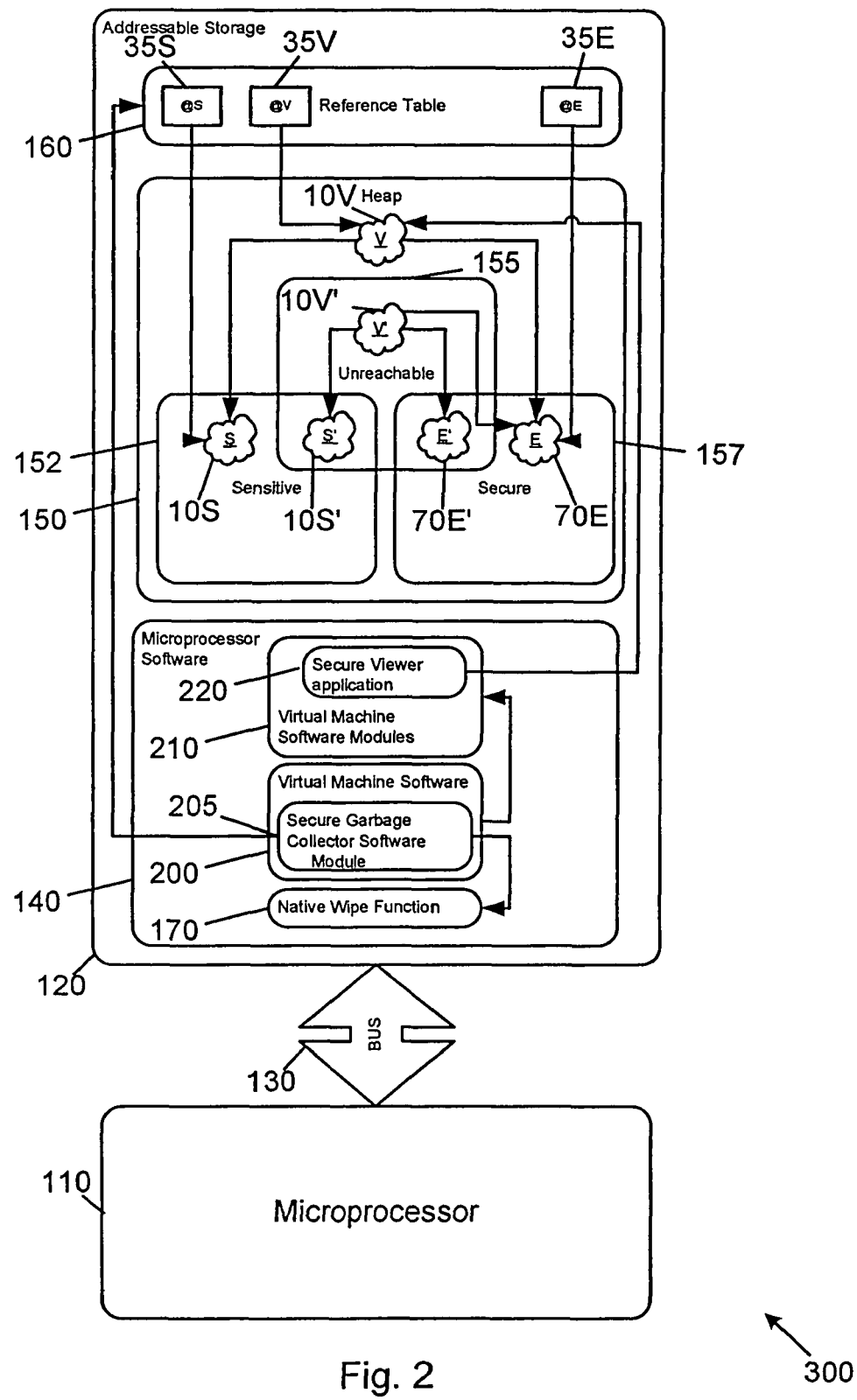
FIG. 2 is a block diagram showing an exemplary secure garbage collection system according to an embodiment of the invention.

With reference now to the Figures, FIG. 2 is a block diagram showing an exemplary secure garbage collection system 300. The system 300 among other things secures sensitive information, which may exist on its own, may arise from Personal Information Management (PIM), or may arise from communications such as voice and/or video calls, short messaging service (SMS) communication, e-mail messaging, web page communication, and wireless access protocol (WAP) communication. The system 300 enables secure decryption techniques and secure persistent storage techniques. Many different types of mobile devices may utilize system 300, such as personal digital assistants, mobile communication devices, cellular phones, and wireless two-way communication devices, as well as in any device that has sensitive information.

The exemplary secure garbage collection system 300 of FIG. 2 includes a microprocessor 110, and an addressable storage 120 connected to microprocessor 110 by a data bus 130. The addressable storage 120 stores microprocessor software modules 140, heap 150 and reference table 160.

Microprocessor software 140 includes a native wipe function 170. The native wipe function 170 can obliterate the data in a portion of addressable storage 120. Suitable functions in the 'C' programming language is the function 'memset( )', which could be used to write over data with all zeroes, all ones, or with random data to thwart sophisticated memory recovery techniques. Microprocessor software 140 also may include virtual machine software 200, having a secure garbage collector software module 205 capable of using native wipe function 170, as well as being able to access objects in heap 150 via reference table 160. Such software 140 may be used in many different implementation environments, such as object-oriented environments (e.g., Java).

Virtual machine software 200 is capable of interpreting virtual machine instructions found in software modules 210. A specific virtual machine software module (e.g., secure viewer application 220) is shown, and will be used as an example application which uses secure garbage collection techniques.

Secure viewer application 220, when executed by virtual machine software 200, results in viewer object 10V being allocated in heap 150, accessible via its corresponding @V 35V entry in reference table 160. Viewer object 10V could be, for instance, a user interface object which displays sensitive information in a sensitive object, such as object 10S. Viewer object 10V preferably dynamically generates sensitive object 10S from secure object 70E by authentication in viewer application 220.

For instance, if secure object 70E is an S/MIME encrypted message, then sensitive object 10S is a clear unencrypted version of the S/MIME message, dynamically generated by secure viewer application module 220, in this case an S/MIME e-mail viewer application, preferably by obtaining and applying a private key to encrypted S/MIME message object 70E.

Heap 150 may be partitioned so that sensitive objects, such as object 10S are distinguishable from secure objects, such as object 70E, as illustrated by regions 152 and 157 which respectively bound sensitive and secure portions of heap 150. It should be understood that many different partitioning configurations (or none at all) are possible with respect to handling sensitive and secure objects in order to fit the situation at hand.

Also shown is a portion of heap 150 which is unreachable, illustrated by region 155. Region 155 contains objects 10V', 10S' and 70E' which are no longer referenced by other objects, and as such, are suitable for garbage collection. Notice that object 10S' is both unreachable and sensitive, object 70E' is both unreachable and secure, whereas object 10V' is only unreachable.

Returning to the S/MIME viewer application 220 example, objects 10V', 10S' and 70E' are unreachable, for instance if the S/MIME viewer application stopped displaying viewer 10V' in response to a delete message user interface command. Thus, if viewer 10V' was the only object having references to sensitive object 10S' and 70E', when the reference to 10V' is lost, all three objects are candidates for garbage collection. Notice however that object 70E, although referenced by viewer 10V', is still reachable and secure (e.g. encrypted S/MIME—perhaps because it was the previous message viewed by viewer 10V' and was not deleted by the user).

Secure garbage collector module 205, once it has detected that objects 10V', 10S' and 70E' are unreachable, securely reclaims the memory they were using by calling native wipe function 170 to wipe, at least object 10S', as well as optionally objects 10V' and 70E'. Optionally, all garbage collections use the wipe native function 170 thereby treating all objects as sensitive.

Figure 3A:
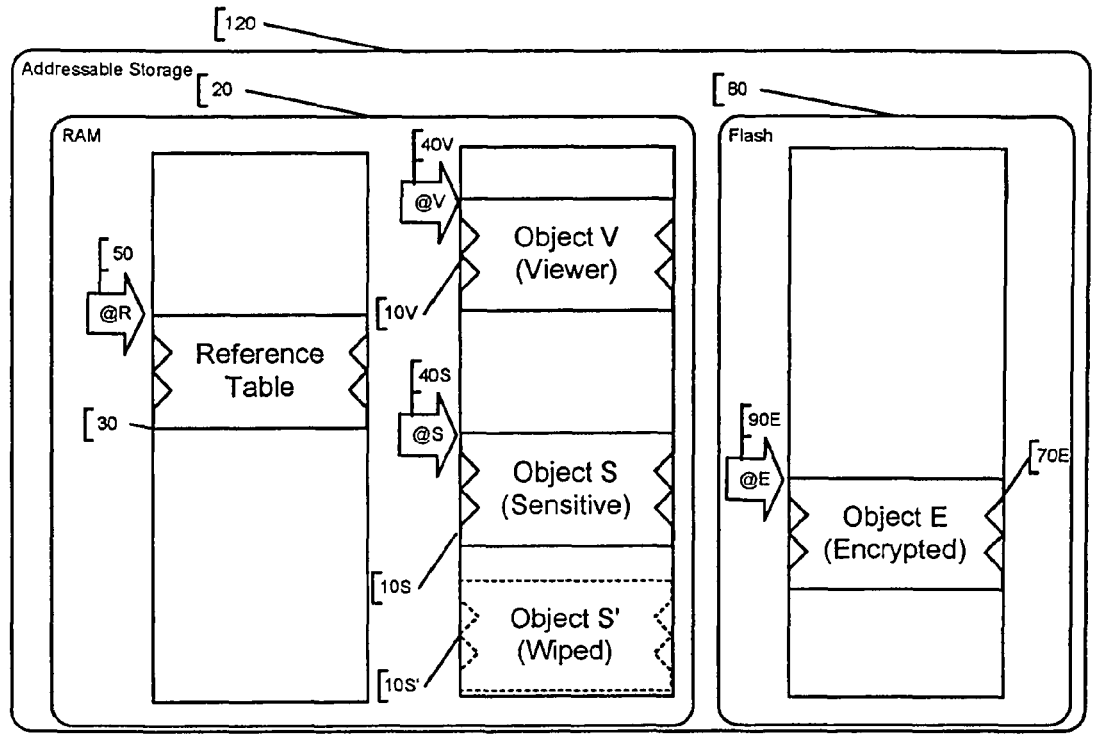
FIG. 3*a* is a block diagram illustrating in greater detail the physical view of an example addressable storage of FIG. 2, featuring objects in RAM and Flash in an exemplary cryptographic message viewing application.
Figure 3B:
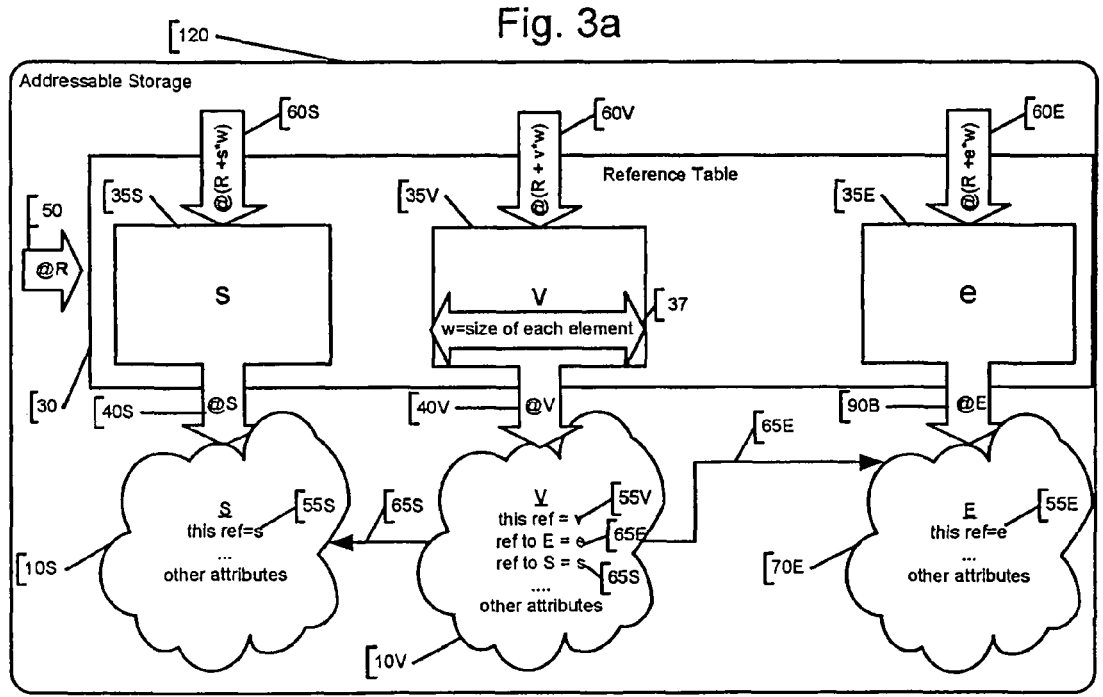
FIG. 3*b* is a block diagram illustrating the logical view of FIG. 3*a*.

With reference to FIGS. 3a and 3b, FIG. 3a is a block diagram illustrating in greater detail the physical view of an example addressable storage of FIG. 2, featuring a reference table, a viewer object in RAM, a persistent encrypted object in Flash, and a transient sensitive object in RAM, in an exemplary cryptographic message viewing application.

FIG. 3b is a block diagram illustrating the logical view of FIG. 3a. Both are described next.

An object 10V that references object 10S and object 70E, are illustrated as they might appear somewhere in RAM 20 or Flash 80.

Also illustrated is a reference table 30, situated somewhere in RAM 20. The reference table 30 has several storage elements (35V, 35S, 35E) of a fixed size "w" 37 to simplify the indexed access to storage elements. Each used storage element (35V, 35S, 35E) corresponds to an object (10V, 10S, 70E) which are located in an addressable space, here consisting of RAM 20 and Flash 80. For example object V 10V finds correspondence with storage element index "v" 35V, object E 70E finds correspondence with storage element index "e" 35E, whereas object S 10S finds correspondence with storage element index "s" 35S. The addresses (40V, 40S, 90E) of corresponding objects (10V, 10S, 70E) are stored in storage elements (35V, 35S, 35E) so that knowing the index of an object in the reference table 30 it is possible to obtain the address (40V, 40S, 90E) of an object (10V, 10S, 70E) respectively. This is done by first obtaining the address @R 50 of the reference table 30. Then, given an object's reference, such as "s" 55S for the example V object 10V, the address of the storage element @(R+v*w) 60V can be obtained by multiplying the index 55V "v" by the size "w" 37 of each storage element.

Since the "v" storage element 35V holds the address of the corresponding object V 10V, resolving the contents of the storage element 35V provides the address @V 40V of object V 10V in RAM 20. Similarly, the "s" storage element 35S, when resolved provides the address @S 40S of object 10S in RAM 20, and the "e" storage element 35E points to an address @E 90E of object 70E in Flash 80. Also shown is how each object (10V, 10S, 70E) contains within its format its "this reference" (55V, 55S, 55E) related to the reference table 30. Also shown is how, object V 10V contains within its format a reference "E" 65E to object E 70E, and a reference "S" 65S to object S 10S. This allows a runtime context within the scope of object V 10V to be able to access objects E 70E and 10S in the same way, regardless of the fact that object E 70E is situated at an address 90E in Flash 80 and objects V 70A is in RAM 20.

Object 10V could be a Secure Multipurpose Internet Mail Extensions (S/MIME) viewer, in which case object 70E could be a persisted (S/MIME) encrypted message, and object 10S could be the sensitive decrypted version of encrypted message 70E. Viewer object 10V could have generated sensitive object 10S from encrypted object 70E at the request of and after authenticating the user of viewer 10V—that is, the intended recipient of the S/MIME message.

Figure 4:
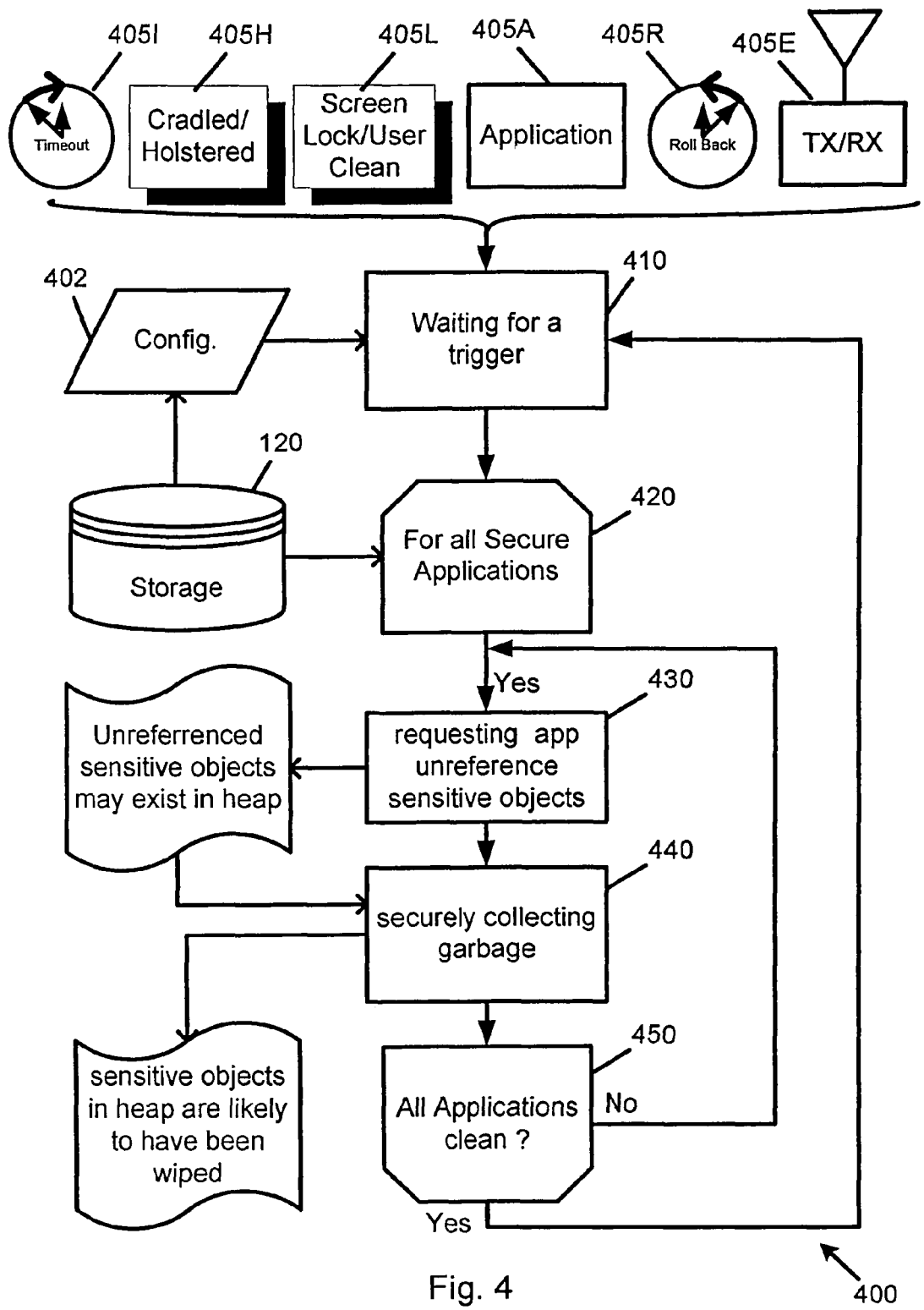
FIG. 4 is a flow diagram showing an example method of triggering secure garbage collection on a mobile device according to an embodiment of the invention.

With reference to FIG. 4, FIG. 4 depicts a flow diagram showing an example method of triggering secure garbage collection on a mobile device. Step 410 includes waiting for a trigger. Any parameters associated with a trigger could be loaded from storage 120 via configuration 402. A trigger can result from many different events, such as but not limited:

405I is a timeout event, which may occur when the mobile device is left idle;

405H is a holstered or cradled event, which may occur when the user, or an attacker, either places or removes the device from its holster (if so equipped) or cradle (if so equipped).

405L is a screen lock or user lock event, which may occur due to any number of reasons, such as when a user enters a password at a lock screen, or when a user expressly locks the device or screen;

405A is an application event, such as when a viewer has stopped displaying a sensitive object. In the case of S/MIME, messages are preferably kept secure (encrypted) and are decrypted only if viewed. However, a configuration parameter could be used to age the decrypted message before causing a secure garbage collection trigger to give the user the opportunity to view a message, close it, and re-open it within a narrow time out period.

405R is a roll back trigger, which can occur whenever the system clock (if so equipped) or a time zone has been altered. A configuration parameter could be used to specify the specific cases.

405E is a transceiver event, which can occur if the mobile device communicates (if so equipped), for instance over a wireless network. For example, when communicating using S/MIME, or while browsing using SSL or TLS, caches may be securely garbage collected.

Step 420 includes performing subsequent steps for all secure applications. Secure applications may be selected by configuration, or may include all applications.

Step 430 includes requesting that a secure application unreference sensitive objects. Thus, this step helps ensure that the window of opportunity of an attacker is greatly limited in secure applications regardless of the trigger.

Step 440 includes securely garbage collecting. This step at least includes calling the native wipe function call, but may also include other actions, such as, but not limited to, cleaning out the system clipboard (if so equipped and configured). An exemplary method to carry out this step is discussed below with reference to FIG. 5.

Step 450 includes determining if all secure applications have been processed. If all secure applications are clean (e.g., applications have no references to sensitive objects), then steps 430 and 440 are repeated for the remaining secure applications. Alternatively, if all secure applications are clean, then step 410 ensues and the method begins anew.

It is noted that the method of FIG. 4 may be implemented as a "Daemon" application for the virtual machine.

Figure 5:
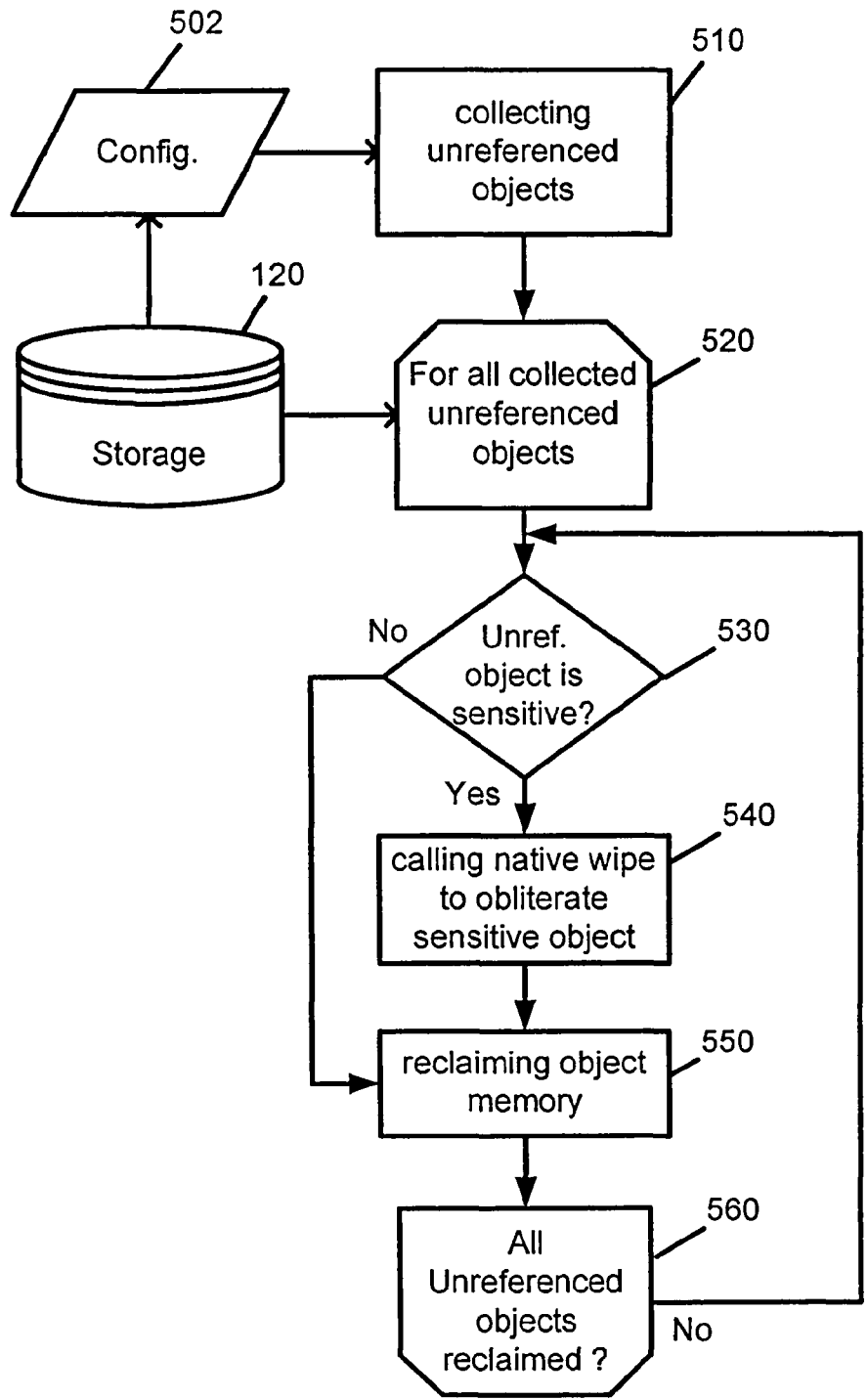
FIG. 5 is a flow diagram showing an example method of secure garbage collection whereby unreferenced objects are securely garbage collected according to an embodiment of the invention.

With reference to FIG. 5, FIG. 5 is a flow diagram showing an exemplary method of secure garbage collection whereby unreferenced objects are securely garbage collected.

The method 500 of FIG. 5 may be used to carry out step 440 of FIG. 4. Step 510 includes collecting unreferenced objects. This step may receive an indication, for instance via configuration information 502, such as which trigger caused the garbage collection in the method 400 of FIG. 4. For example, if an S/MIME viewer application was the trigger, then unreferenced sensitive objects would preferably be collected from the heap starting near the cause of the trigger.

Step 520 includes performing subsequent steps for all unreferenced objects in the heap. Step 530 includes determining if the unreferenced object is sensitive. As was described in reference to FIG. 2, in a preferred embodiment, all unreferenced objects are treated as sensitive. This may also be specified in the configuration information 502. If the unreferenced object is determined to be sensitive, then step 540 ensues, followed by step 550; if not, then step 550 ensues.

Step 540 includes calling the native wipe function to obliterate the sensitive information in the unreferenced sensitive object. As was described in reference to FIG. 2, the native wipe function could be a C "memset( )" of object data to zeroes, ones, or random data. Which option to use could be specified in configuration 502. It is also envisaged that a non-native wipe function could be used.

Step 550 includes reclaiming object memory. This step could be accomplished by a traditional garbage collector. By replacing all calls to the traditional garbage collector with calls to a secure garbage collector, secure garbage collection can be enabled in many existing methods and systems.

Step 560 includes determining if all unreferenced objects have been reclaimed. If this is determined, then the method ends. If not, then step 530 ensues to continue secure garbage collection.

Figure 6:
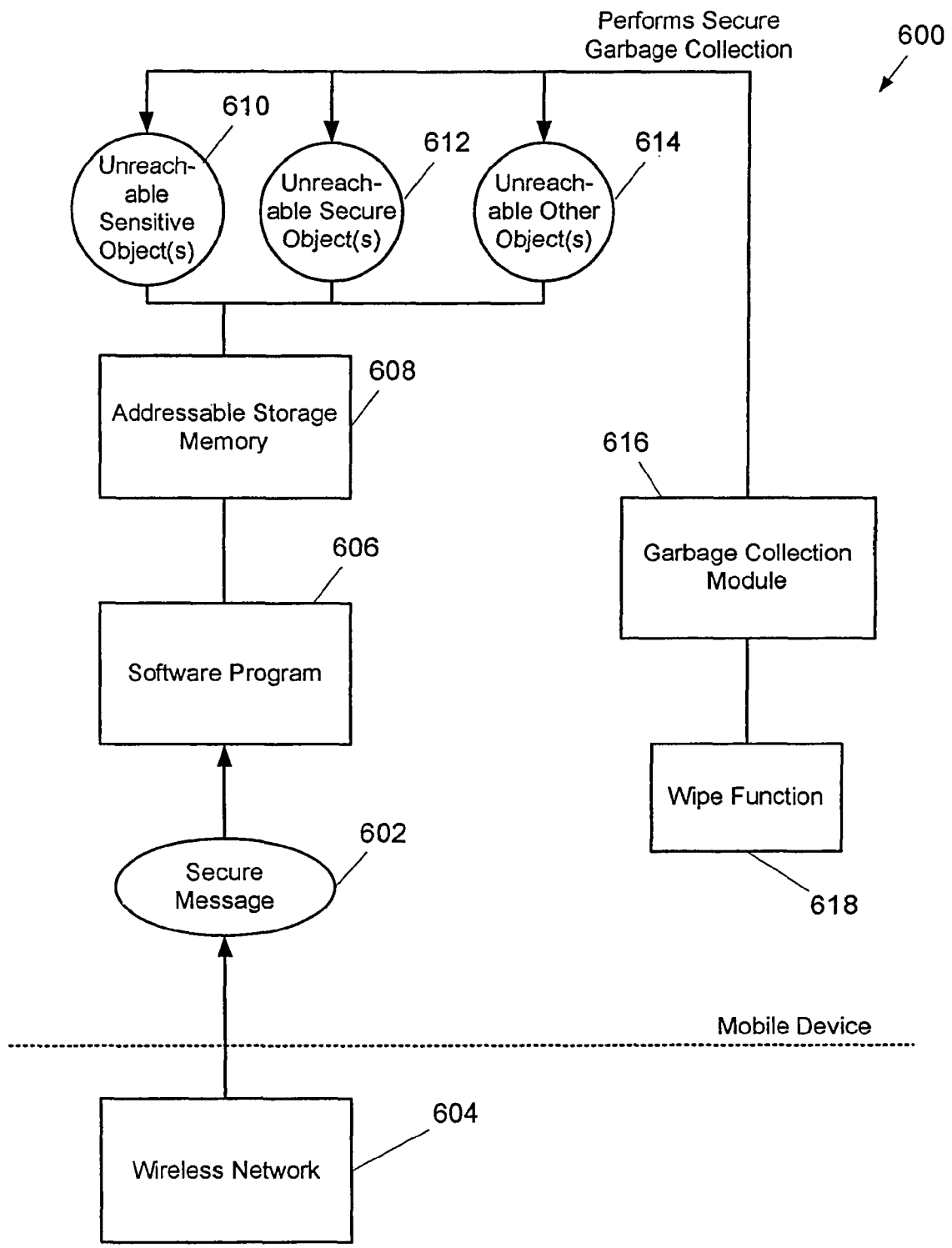
FIG. 6 is a block diagram illustrating software components for use in secure garbage collection on a mobile device.

FIG. 6 illustrates at 600 a mobile device having a secure garbage collection system. The mobile device 600 receives information (e.g., secure message 602) over a wireless network 604. A software program 606 operating on the mobile device 600 processes the secure message 602 such that a secure object is created and is stored within addressable storage memory 608 to handle the secure message 602. In this example, sensitive information is extracted from the secure message 606, and a sensitive object is created and stored within addressable storage memory 608 in order to handle the sensitive information.

When objects (610, 612, 614) in the addressable storage memory 608 are detected as unreachable, a secure garbage collector module 616 securely reclaims the memory 608 the objects (610, 612, 614) were using by calling a wipe function 618. Optionally, all garbage collections use the wipe function 618 thereby treating all objects (610, 612, 614) as sensitive. However, it should be understood that the garbage collection module 616 may vary the type of objects the wipe function 618 may be used for. For example, the garbage collection module 616 may be configured to only use the wipe function 618 upon unreachable sensitive objects 610, or only upon unreachable secure objects 612, or combinations thereof. Moreover, the garbage collection module 616 may be configured to use the wipe function 618 upon unreachable objects of one or more software programs. Such approaches initiate secure garbage collection in order to prevent unauthorized access to sensitive information. Thus, secure garbage collection is initiated when an object (such as a sensitive object) becomes unreachable rather than only when memory becomes scarce.

Figure 7:
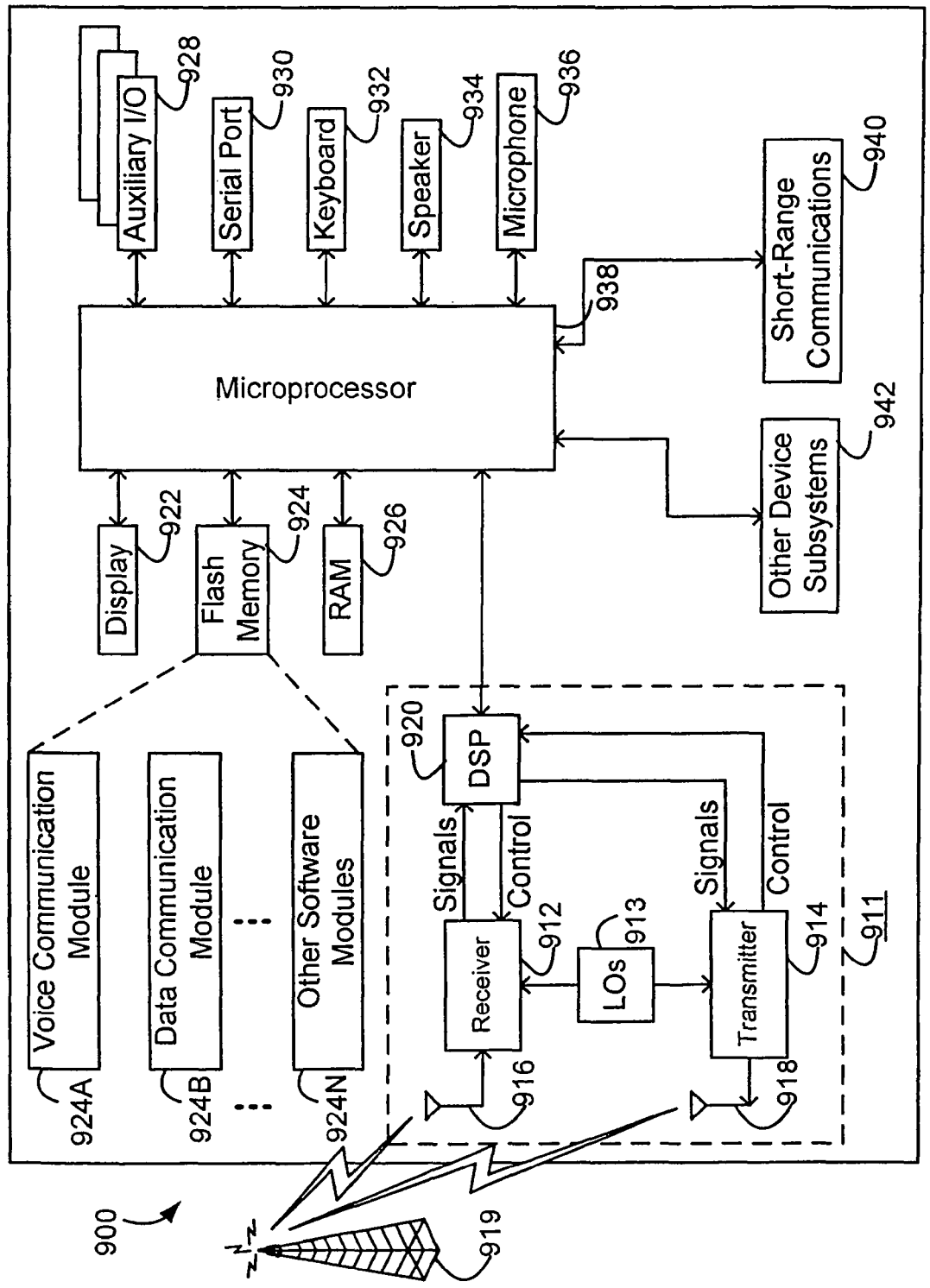
FIG. 7 is a schematic diagram of an exemplary wireless device's components.

Many different types of mobile devices may utilize the systems and methods disclosed herein, such as a wireless device shown in FIG. 7. With reference to FIG. 7, wireless device 900 is preferably a two-way communication device having at least voice and data communication capabilities. The device 900 preferably has the capability to communicate with other computer systems on the Internet. Depending on the functionality provided by the device, the device 900 may be referred to as a data messaging device, a two-way pager, a cellular telephone with data messaging capabilities, a wireless Internet appliance or a data communication device (with or without telephony capabilities).

Where the device 900 is enabled for two-way communications, the device 900 may incorporate a communication subsystem 911, including a receiver 912, a transmitter 914, and associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, a device 900 destined for a North American market may include a communication subsystem 911 designed to operate within the Mobitex mobile communication system or DataTAC mobile communication system, whereas a device 900 intended for use in Europe may incorporate a General Packet Radio Service (GPRS) communication subsystem 911.

In general, the device 900 may acquire or generate secure and sensitive information through its interaction with cellular networks and the services the networks provide. Examples of cellular networks and services they provide include Code Division Multiple Access (CDMA) and Global Service Mobile (GSM) networks which provide for the most part voice and some data services. Voice services are typically compatible with plain old telephony service (POTS). Short Messaging Service (SMS) and Wireless Application Protocol (WAP) are available on some cellular networks. Data networks, such as MobiTex™, Datatac™, as well as advanced networks such as General Packet Radio Service (GPRS), and Universal Mobile Telecommunications System (UMTS), may allow an appropriately configured wireless mobile device to offer data services such as e-mail, web browsing, SMS, WAP, as well as PIM. Future networks may also offer video services. Thus, sources of sensitive information abound.

Network access requirements will also vary depending upon the type of network 919. For example, in the Mobitex and DataTAC networks, mobile devices such as 900 are registered on the network using a unique personal identification number or PIN associated with each device. In GPRS networks however, network access is associated with a subscriber or user of a device 900. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 900 will be unable to carry out any functions involving communications over network 919. When required network registration or activation procedures have been completed, a device 900 may send and receive communication signals over the network 919. Signals received by the antenna 916 through a communication network 919 are input to the receiver 912, which may perform such common receiver functions as signal amplification, frequency down conversion, filtering, channel selection and the like, and in the example system shown in FIG. 7, analog to digital conversion. Analog to digital conversion of a received signal allows more complex communication functions such as demodulation and decoding to be performed in the DSP 920. In a similar manner, signals to be transmitted are processed, including modulation and encoding for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The device 900 preferably includes a microprocessor 938, which controls the overall operation of the device. Communication functions, including at least data and voice communications, are performed through the communication subsystem 911. The microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 7 perform communication-related functions, whereas other subsystems may provide "resident" or on-device functions. Notably, some subsystems, such as keyboard 932 and display 922 for example, may be used for both communication-related functions, such as entering a text message for transmission over a communication network, and device-resident functions such as a calculator or task list.

Operating system software used by the microprocessor 938, which could be element 110 of FIG. 2 is preferably stored in a persistent store such as flash memory 924, which could be element 80 of FIG. 3a and may instead be a read only memory (ROM) or similar storage element or could be a portion of addressable storage 120 of FIGS. 2, 3a and 3b. Those skilled in the art will appreciate that the operating system, specific device applications, or parts thereof, may be temporarily loaded into a volatile store such as RAM 926, which could be element 20 of FIG. 2. It is contemplated that received communication signals may also be stored to RAM 926. Flash memory 924 preferably includes data communication module 924B, and when device 900 is enabled for voice communication, voice communication module 924A. For the purposes of this invention, are also included in flash memory 924 other software modules 924N, which could be microprocessor software 140 of FIG. 2.

The microprocessor 938, in addition to its operating system functions, preferably enables execution of software applications on the device. A predetermined set of applications which control basic device operations, including at least data and voice communication applications for example, will normally be installed on the device 900 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores may be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system. Further applications may also be loaded onto the device 900 through the network 919, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the device 900.

In a data communication mode, a received signal such as a text message or web page download will be processed by the communication subsystem 911 and input to the microprocessor 938, which will preferably further process the received signal for output to the display 922, or alternatively to an auxiliary I/O device 928. A user of device 900 may also compose data items such as e-mail messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the device 900 is substantially similar, except that received signals would preferably be output to a speaker 934 and signals for transmission would be generated by a microphone 936. Alternative voice or audio I/O subsystems such as a voice message recording subsystem may also be implemented on the device 900. Although voice or audio signal output is preferably accomplished primarily through the speaker 934, the display 922 may also be used to provide an indication of the identity of a calling party, the duration of a voice call, or other voice call related information for example.

The serial port 930, would normally be implemented in a personal digital assistant (PDA)-type communication device for which synchronization with a user's desktop computer (not shown) may be desirable, but is an optional device component. Such a port 930 would enable a user to set preferences through an external device or software application and would extend the capabilities of the device by providing for information or software downloads to the device 900 other than through a wireless communication network. The alternate download path may for example be used to load an encryption key onto the device through a direct and thus reliable and trusted connection to thereby enable secure device communication.

A short-range communications subsystem 940 is a further optional component which may provide for communication between the device 900 and different systems or devices, which need not necessarily be similar devices. For example, the subsystem 940 may include an infrared device and associated circuits and components or a Bluetooth™ communication module to provide for communication with similarly-enabled systems and devices.

Having described in detail the preferred embodiments of the present invention, including the preferred methods of operation, it is to be understood that this operation could be carried out with different elements and steps. This preferred embodiment is presented only by way of example and is not meant to limit the scope of the present invention. This written description may enable those skilled in the art to make and use embodiments having alternative elements that likewise correspond to the elements of the invention. The intended scope of the invention thus includes other structures, systems or methods that do not differ from the literal language of the description, and further includes other structures, systems or methods with insubstantial differences from the literal language of the description.

It is claimed:

1. One or more non-transitory computer readable media comprising computer readable instructions that, when executed, cause a mobile device to perform:
    receiving secure information over a wireless network;
    extracting sensitive information from the secure information;
    storing the sensitive information in memory of the mobile device, wherein the sensitive information is accessible using an object;
    unreferencing the object;
    determining that the object has become unreachable because the object was unreferenced;
    based upon the determination that the object has become unreachable, calling a wipe function to overwrite a memory of the mobile device where the unreachable object is stored; and
    reclaiming the memory that the object was using.

2. The non-transitory computer readable media of claim 1, wherein the mobile device is a personal digital assistant.

3. The non-transitory computer readable media of claim 1, wherein the mobile device is a mobile communication device.

4. The non-transitory computer readable media of claim 1, wherein the mobile device is a cellular telephone with data messaging capabilities.

5. The non-transitory computer readable media of claim 1, wherein the mobile device is a wireless two-way communication device.

6. The non-transitory computer readable media of claim 1, wherein the mobile device is a data messaging device.

7. The non-transitory computer readable media of claim 1, wherein the mobile device is a two-way pager.

8. The non-transitory computer readable media of claim 1, wherein the mobile device is a wireless Internet appliance.

9. The non-transitory computer readable media of claim 1, wherein the wireless network includes means for providing the wireless network.

10. The non-transitory computer readable media of claim 1, wherein the secure information is an S/MIME encrypted message.

11. The non-transitory computer readable media of claim 10, wherein the sensitive information is an unencrypted version of the S/MIME message.

12. The non-transitory computer readable media of claim 11, wherein the secure message was unencrypted by obtaining and applying a private key to the encrypted S/MIME message.

13. The non-transitory computer readable media of claim 1, wherein the sensitive information arises from use of a Personal Information Management (PIM) application.

14. The non-transitory computer readable media of claim 1, wherein overwriting the unreachable object includes overwriting the memory location where the unreachable object is stored with a sequence of bits comprising all zeros, all ones, or random data.

15. The non-transitory computer readable media of claim 1, wherein the object is a user interface object configured to display the sensitive information.

* * * * *